United States Patent [19]

Taffer

[11] Patent Number: 4,852,910

[45] Date of Patent: Aug. 1, 1989

[54] APPARATUS AND METHOD FOR SELECTING AND PLAYING MUSIC

[76] Inventor: Jon Taffer, 2806 Centre Cir., Downers Grove, Ill. 60515

[21] Appl. No.: 402

[22] Filed: Jan. 5, 1987

[51] Int. Cl.[4] .......................... B42D 15/00; B42D 1/00; B42D 1/08; G11B 3/82

[52] U.S. Cl. .......................................... 283/67; 283/50; 283/114; 281/15.1

[58] Field of Search ...................... 283/1 R, 67, 40, 42, 283/36, 38, 47, 48 A, 50, 52, 31, 24, 63.1, 67, 114, 31; 281/15 R, 3 R

[56] References Cited

U.S. PATENT DOCUMENTS 4,355,824 10/1982 Weber et al. ...................... 283/114
4,626,836 12/1986 Curtis et al. ...................... 283/67
4,679,823 7/1987 Nagy ................................. 283/31

*Primary Examiner*—Frank T. Yost
*Assistant Examiner*—Paul M. Heyrana, Sr.
*Attorney, Agent, or Firm*—Hill, Van Santen, Steadman & Simpson

[57] ABSTRACT

Apparatus for selecting and playing music incorporates a set of color-coded books containing listings of music on records available to an establishment, indexed by energy, type and tempo, a set of coordinated color-coded jackets for the records, and a schedule grid for establishing the relationship between a plurality of time periods and the energy, type and tempo of music to be played during such time periods in order to create and maintain a given desired musical ambiance.

11 Claims, 1 Drawing Sheet

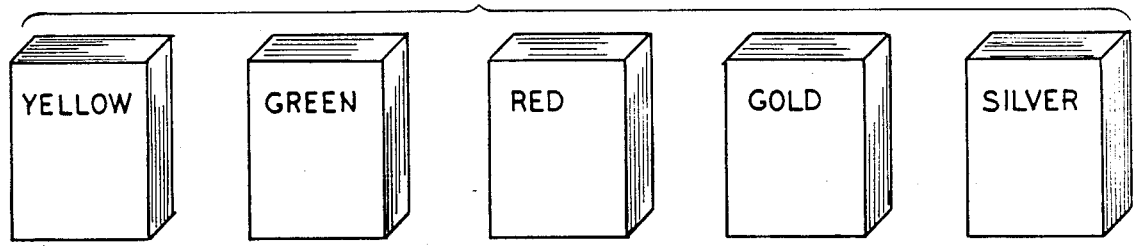
COLOR-CODED BOOKS
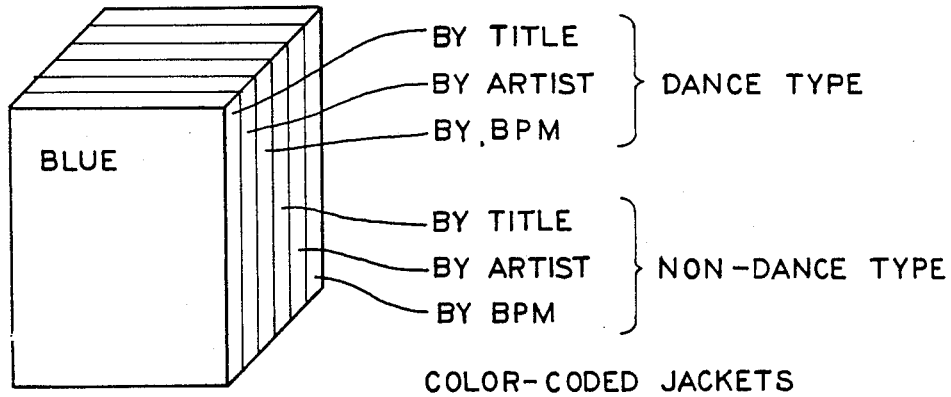
COLOR-CODED JACKETS
FIG. 1
| SCHEDULE GRID FOR XXX NIGHTCLUB ||||
|---|---|---|---|
| TIME | COLOR(S) | BPM | TYPE |
| 5:00PM–6:00PM | 50% SILVER<br>50% GOLD | 60–100<br>60–100 | |
| 6:00PM–7:00PM | 20% GOLD<br>10% SILVER<br>70% BLUE | 110–125<br>110–140<br>54–109 | 50% DANCE |
| 7:00PM–8:00PM | 20% BLUE<br>80% YELLOW | 100–117<br>115–160 | 50% DANCE<br>50% DANCE |
| 8:00PM–9:30PM | 10% YELLOW<br>90% GREEN | 125–160<br>104–130 | 80% DANCE<br>80% DANCE |
| 9:30PM–10:45PM | 100% GREEN | 115–140 | 80% DANCE |
| 10:45PM– | 80% GREEN<br>20% RED | 120–140<br>116–150 | 90% DANCE<br>90% DANCE |
FIG. 2

APPARATUS AND METHOD FOR SELECTING AND PLAYING MUSIC

BACKGROUND

This invention relates to apparatus and a method for selecting and playing music, and more particularly to such apparatus and method which can be used to select and play music to create and maintain a desired musical ambiance within a public establishment such as a nightclub, or the like.

It is well known that the musical ambiance is very important to a nightclub or the like, in which commercial success may be largely dependent on the musical ambiance, together with other factors. Repeat visits to such an establishment by its patrons is fostered by preserving the same musical ambiance at the same time each day, during given hours of the daytime and evening, with the same musical ambiance repeating reliably from day to day, and from week to week.

The total ambiance of an establishment is created partly by fixed factors, such as decor and the like, which do not change with time. These factors need to be selected only once, so that expensive expert consultation is not required on a regular basis. However, the music which is heard by the patrons is subject to a continuous selection process. The appropriate selection of the proper music is also of vital importance in the establishment of a musical ambiance for the establishment, and to the formation of positive attitudes toward the establishment by customers, which lead to repeat business, and business growth, through word of mouth publicity.

The particular music selections required to be played for establishing a given ambiance at any given time depend on specific characteristics, such as demographic characteristic of the patrons of the establishment, for example, and these characteristics vary with the location of the establishment, the class of patrons it serves, etc., as well as the time of day for any given day of the week.

In the past, it has been possible to make decisions concerning the music to be played at any given time, and playing the same, by using a disc jockey or the like. The disc jockey selects the music required for the demands of the moment, and sees to its playing, by putting the record, whether disc or tape in the appropriate player, etc. However, the skill required to make appropriate selections of music on a moment to moment basis is achieved only after much training and, therefore, relatively expensive personnel are required, who are expert in the art of selecting the appropriate music to create a desired musical ambiance. Any change in the identity of the disc jockey or person making the selections can have the undesirable effect of changing the ambiance of the establishment, thus tending to discourage repeat business from its customers, and limiting the growth of the business.

Therefore, it is desirable to provide apparatus and a method for selecting music to be played at any given time, which does not require the services of highly trained or highly skilled personnel, and which is not subject to the variations which necessarily result from personnel changes and uneven day to day performance of the disc jockey.

SUMMARY OF THE INVENTION

It is a principal object of the present invention to provide apparatus and a method for enabling unsophisticated personnel to select and play music to establish and maintain a predetermined musical ambiance.

Another object of the present invention is to provide an apparatus and a method for creating a given ambiance within a public establishment, and for insuring the repetition of the same ambiance on a day to day basis, from week to week, without the need for the superior skill of highly trained personnel.

A further object of the present invention is to provide an apparatus and a method for allowing the selection and playing of music with an energy level suited to the ambiance desired for a given establishment, with provision for adjusting the energy level as required by changes in ambiance to suit different classes of patrons from hour to hour, on a daily and weekly basis.

Another object of the present invention is to provide apparatus and a method for selection and playing of music for creating and maintaining a given ambiance, with provision for the selection of an advantageous range of tempos, to maintain excitement and freshness to the ambiance, and to accommodate the comfort of the patrons.

In one embodiment of the present invention, there is provided apparatus comprising a set of color coded-books, each containing a listing of musical select&ions at a specific energy level corresponding to music recorded on records available to the establishment, such books being indexed by music type and tempo; a set of jackets with coordinated color-coded labels for said records; and a schedule grid correlating, in tabular form, the relationship between a plurality of time periods and specific energy levels, types and tempos of musical selections required to establish and maintain a given musical ambiance during such time periods.

In another embodiment of the present invention, there is provided a method for selecting music to establish and maintain a desired musical ambiance within a public establishment, including the steps of providing a set of color-coded books, each containing a listing of musical selections at a specific energy level on records available to the establishment, and indexed by type and tempo; providing a set of jackets with coordinated color-coded labels for said records; providing a schedule grid correlating, in tabular form, the relationships between plural time periods and specific energy levels, types and tempos of musical selections required to establish and maintain said musical ambiance, and selecting and playing said records in accordance with said relationships.

BRIEF DESCRIPTION OF THE DRAWINGS

Reference will now be made to the accompanying drawings, in which:

FIG. 1 is a perspective view showing the color-coded books and record jackets of the present invention; and FIG. 2 is an illustration of an illustrative grid used with the present invention for a given establishment.

DETAILED DESCRIPTION

Referring now to the drawings, FIGS. 1 and 2 show apparatus used for simplifying the selection and playing of appropriate music for a predetermined musical ambiance, and for making it possible to do so without the need for highly trained and expensive personnel.

The color-coded books shown in FIG. 1 contain listings of all the music on records in the record collection of the establishment, and the coordinated color-coded record jackets comprise a convenient arrangement for storing the records, arranged by color, so that the music assigned to a particular color is readily available. The color of each book corresponds to the energy level of the music in such book. The color blue is assigned to the music of the lowest energy level, corresponding to what might be referred to as easy listening or background music. The color red is assigned to the music of the highest energy level, corresponding to music with an exciting and dynamic quality. Intermediate levels of energy correspond to the colors yellow and green, which are assigned to the books containing listings of music of intermediate energy.

Two other books, of the colors gold and silver, respectively, contain music of the 50's and music of the 60's, which have sufficiently unique energies to be assigned unique colors.

The listings in each book are of musical selections corresponding to the color of the book, and are identified in the listings by title of the piece, performing artist, the music type (either dance or non-dance type) and the tempo of the piece in terms of BPM or beats per minute. Each book is indexed by title, artist, type and tempo, with a separate section for each, as shown, to facilitate the selection of pieces by any of these criteria. The music is assigned to each book by persons who are expert in the classification of music by energy level and by type. The BPM number assigned to each musical piece is objective and is determined by counting the number of beats heard during the period of 60 seconds, while the music is being played.

The schedule grid of FIG. 2 correlates the music listed in the color-coded books with the energy, type, and tempo of the music required for a given ambiance. The grid of FIG. 2 is drawn up by an expert in the selection of music to create and maintain a predetermined musical ambiance, and preferably is drawn up after a review of the needs of the particular establishment, as revealed by a survey of customer characteristics and preferences, and a survey of the other relevant characteristics of the establishment, such as location, traffic patterns, customary scheduling of events affecting the establishment. The drawing up of the grid of FIG. 2 requires great skill, and the employment of expert techniques which are familiar to practitioners in the art, but which form no part of the present invention. The present invention makes it possible for an establishment to make use of such expertise on a regular basis, without the need to have such a highly trained and highly skilled person on site.

The musical pieces listed in the books of FIG. 1 are selected to give a large variety of selections of musical pieces corresponding to the energy levels, types and tempos required by the schedule grid, so there is no need for repetition of any particular sequence of musical pieces.

The schedule grid of FIG. 2 is laid out for a given day, with the time periods assigned to horizontal boxes. Thus, each box corresponds to a particular period of time during a week. In each box is the identification of the energy color of the music to be played during that time period, together with the percentages of dance type and non-dance type music, and a range of beats per minute. Guided by the schedule grid, an unskilled disc jockey may make selections from the record collection of the establishment, selecting music of the appropriate color from the color-coded books corresponding thereto, and having the required type and a BPM number within the required range. Within those parameters, the selection and order of playing of the various musical pieces is entirely unspecified, so that the unskilled disc jockey may use his own preferences to make specific selections, without interfering with the predetermined ambiance, which is established by the energy, type proportion and tempo specified by the schedule grid. This allows for an amount of freedom of action for the disc jockey so that he can exercise his originality in making individual selections of musical pieces, and can also respond, if desired, to current requests from the audience for particular pieces to be played.

The jackets with color-coded record labels shown in FIG. 1 make it easy for the disc jockey to find music of the appropriate energy, because the energy color of each piece of music corresponds to the color of the jacket housing the record on which the piece is to be found, and each jacket has the artist, record name, and the title and BPM of each piece on the record which is listed in the color-coded books. The music pieces which are listed in the color-coded books and on the jacket label are approved pieces i.e. they can be played, at times identified by the schedule grid, in order to maintain the desired musical ambiance. Other music pieces which may be on the record or album are not approved, because their energy level, BPM, etc. are not called for by the schedule grid. Thus, the omission of non-approved music from the jacket labels tends to minimize the opportunities for playing music not consistent with the schedule grid. The jackets also assist in the process of inventory control, by which the establishment can maintain its record collection, replacing records as necessary as they become damaged or worn out.

The range of BPM established for each time period allows the unskilled disc jockey to select, at any given time, music of a tempo to suit the occasion. If he senses that the patrons of the establishment are bored with the present tempo, he can select music with a higher BPM, although still within the specified BPM range. On the other hand, if he senses that the patrons are becoming exhausted, and in need of a rest, he can select a tempo with a lower BPM. This allows flexibility, for the purpose of promoting the comfort and excitement of the patrons, while still preserving the predetermined musical ambiance so that patrons just arriving at the establishment will find the same musical ambiance which they found at the same time of day during the previous day, or during the previous week. Normally, music will be selected so that the BPM is near the low end of the range at the beginning of the time period, and increases during the time period toward the high end of the range.

The contents of the color-coded books, and the lay out of the schedule grid, are established by a one-time application of the expertise needed for these items, and the inventory of records may be assembled at that time. Thereafter, it may be desirable periodically to review the listings of the musical pieces contained in the color-coded books, to insure that current music is included and that pieces which are out of favor with the patrons of the establishment are discarded. However, for the most part, no expert assistance is required after the system is first set up to maintain the musical ambiance that the system is initially designed to create, and unskilled persons can operate the system reliably to achieve that object.

By use of the method and apparatus of the present invention, the owners and/or managers of the establishment can be assured that the musical ambiance which has been selected for the establishment is achieved, even though neither the manager, nor the disc jockey, is skilled in the field of selecting music in order to achieve a given ambience. The present invention is not a substitute for management of the establishment, but offers a management tool which is effective in managing the music of the establishment.

It will be understood that variations and modifications may be effected without departing from the spirit and scope of the novel concepts of the present invention, which are intended to be defined by the appended claims.

I claim as my invention:

1. A method of selecting and playing music to create and maintain a predetermined musical ambiance for a public establishment, without the need for highly trained personnel on site, comprising the steps of; providing a set of color-coded books containing listings of musical pieces on records available to the establishment, the color of each of said books corresponding to the audience reaction or energy of the music listed therein; providing a schedule grid correlating plural time periods with the energy color of music to be played during such time periods for such predetermined musical ambiance; referring to the book of the corresponding energy for each of said time periods and selecting therefrom particular music pieces to be played during said time periods to maintain said predetermined musical ambiance; and playing said selected musical pieces within said time periods.

2. The method of claim 1, including the step of including in each of said listings an identification of the type of music for each of the pieces listed in said books, providing said schedule grid with a designation of the proportion of the type of music to be played during each of said time periods, whereby the appropriate percentage of music of a given type may be selected for each of said time periods, consistent with said predetermined musical ambiance.

3. The method of claim 1, including the step of including in each of said listings an identification of the tempo of music for each of the pieces listed in said books, providing said schedule grid with a designation of a range of tempos for music to be played during each of said time periods, whereby the appropriate tempos of music may be selected for each of said time periods, consistent with said predetermined musical ambiance.

4. The method according to claim 3, including the step of indexing each of said color-coded books in accordance with the tempo of the music listed therein.

5. A method of selecting and playing music to create and maintain a predetermined musical ambiance for an environment containing an audience, without the need for highly trained personnel, comprising the steps of; providing a set of books each containing listings of musical pieces on records located on site, each of said books listing only musical pieces corresponding to a different predetermined reaction of said audience or energy level, and selecting and playing any musical piece, during predetermined time periods, which piece is listed in one of said set of books corresponding to the musical ambiance desired for said time periods.

6. The method according to claim 5, including the step of providing a schedule grid correlating plural predetermined time periods with particular ones of said set of books, corresponding to audience reaction or energy levels which correspond to the musical ambiance to be maintained during such time periods, and referring to said schedule grid for selecting one of said set of books during each of said predetermined time periods.

7. The method according to claim 5, including the step of providing a schedule grid which correlates said predetermined time periods with the type of music associated with a predetermined musical ambiance, and selecting and playing, during each said predetermined time period, any musical piece listed in the book corresponding to a given audience reaction or energy level and type of music identified by said grid.

8. The method according to claim 7, including the steps of providing a schedule grid which correlates said predetermined time periods with the tempo of music previously selected to correspond to a predetermined musical ambiance during said predetermined time period, and selecting and playing, during said predetermined time period, any musical piece listed in said one book corresponding to a given audience reaction or energy level, the type and the tempo corresponding to said predetermined time period.

9. Apparatus for facilitating the selection and playing of music to create and maintain a predetermined musical ambiance, without the need for highly trained personnel, comprising, in combination; a set of books, each containing listings of music located on site corresponding to a different reaction of said audience or 0127 energy level, and a schedule grid correlating a plurality of time periods with the energy level of music to be played during said time periods in accordance with a predetermined musical ambiance for said time periods, whereby said musical ambiance may be established and maintained by the selection and playing, during said predetermined time period, of any musical piece listed in the book identified by said grid as corresponding to said predetermined time period.

10. Apparatus according to claim 9, including a plurality of record jackets for storing records with said music pieces, and means for visually identifying each of said jackets with one of said books, whereby said musical ambiance may be maintained by selecting and playing, during said predetermined time periods, a musical piece on any of said records which are contained in jackets corresponding to a given audience reaction or energy level corresponding to said predetermined time period.

11. Apparatus according to claim 9, wherein said schedule grid comprises a grid with identifiers for each of a plurality of predetermined time periods, said identifiers corresponding to the energy of the music to be played during said time period, the tempo of the music to be played during said time period, and the type of music to be played during said time period, whereby selection and playing, during said predetermined time period, maintains said musical ambiance during said time period.

* * * * *